United States Patent [19]

Chen et al.

[11] 3,857,734

[45] Dec. 31, 1974

[54] MANGANESE BISMUTH THIN FILMS ON REACTIVE SUBSTRATES

[75] Inventors: Di Chen, Minnetonka; Gary N. Otto, Mayer, both of Minn.

[73] Assignee: Honeywell Inc., Minneapolis, Minn.

[22] Filed: May 4, 1972

[21] Appl. No.: 250,443

[52] U.S. Cl. .................................. 117/240, 117/235

[51] Int. Cl. .................................. H01f 10/02

[58] Field of Search .................................. 117/235–240

[56] References Cited

UNITED STATES PATENTS

| | | | |
|---|---|---|---|
| 3,321,328 | 5/1967 | Koretzky | 117/239 |
| 3,418,710 | 12/1968 | Seidel et al. | 117/237 UX |
| 3,470,020 | 9/1969 | Boudreaux et al. | 117/239 X |
| 3,492,158 | 1/1970 | Scow et al. | 117/239 X |
| 3,539,383 | 11/1970 | Di Chen et al. | 117/239 X |
| 3,619,289 | 11/1971 | Di Chen et al. | 117/235 |
| 3,642,533 | 2/1972 | Ahn et al. | 117/237 |

OTHER PUBLICATIONS

AD607220 pp. 19–24, 9–64.

*Primary Examiner*—William D. Martin
*Assistant Examiner*—Bernard D. Pianalto
*Attorney, Agent, or Firm*—David R. Fairbairn; Lamont B. Koontz

[57] ABSTRACT

Uniform magnetic thin films of manganese bismuth are produced on a nonmagnetic substrate capable of reacting with manganese, bismuth, or manganese bismuth. A thin passivating layer of oxidized aluminum covers the substrate and the manganese bismuth thin film overlays the thin passivating layer.

9 Claims, No Drawings

MANGANESE BISMUTH THIN FILMS ON REACTIVE SUBSTRATES

BACKGROUND OF THE INVENTION

One highly advantageous magneto-optic material useful for information storage is manganese bismuth. Thin films of manganese bismuth have been the subject of extensive investigation as possible magneto-optic memory elements because they exhibit an unusually large magneto-optic effect and because reproducible large area films can be produced with the preferred magnetization direction oriented normal to the plane of the film.

The preparation of reproducible large area manganese bismuth films with the desired magnetic properties was described by Chem et al in U.S. Pat. No. 3,539,383. Bismuth is deposited first on a substrate, manganese is deposited over the bismuth and the manganese and bismuth are heated to form manganese bismuth film.

The possibility of depositing manganese bismuth films on flexible substrates offers even further use of manganese bismuth films in erasable strips chart recorders and in holographic storage systems similar to the system described by M. J. Hannan in U.S. Pat. No. 3,601,465.

Attempts to produce manganese bismuth films on flexible substrates of synthetic organic material such as Dupont Teflon and 3-M Scotchpak polyester by the conventional preparation techniques have not been successful. The films evaporated on the flexible substrates have been nonmagnetic whereas good quality films were produced in the same run using glass or mica substrates.

SUMMARY OF THE INVENTION

It has been discovered that the failure to obtain manganese bismuth films on flexible substrates is caused by chemical reaction between the substrate material and manganese, bismuth, or manganese bismuth during the final heating step of manganese bismuth film preparation.

With the present invention, reproducible large area thin films of manganese bismuth having substantially uniform magnetic properties and the preferred magnetization direction oriented normal to the plane of the film are prepared on a nonmagnetic substrate capable of reacting with manganese, bismuth, or manganese bismuth. A thin layer of aluminum is deposited on the nonmagnetic substrate. The thin layer of aluminum is then oxidized to form a thin passivating layer. Bismuth is deposited on the passivating layer, and then manganese is deposited over the bismuth. The deposited manganese and bismuth are then heated to form manganese bismuth compound.

DESCRIPTION OF THE PREFERRED EMBODIMENTS

In one preferred embodiment of the present invention, uniform magnetic thin films of manganese bismuth are formed on synthetic organic substrate, such as thin films of high temperature polyfluoroethylene. The substrate material is thoroughly cleaned with acetone and alcohol and the clean substrate is mounted in a vacuum system. Upon reaching a suitable vacuum for deposition, a thin layer of aluminum is deposited. It has been found that a layer of aluminum having a thickness of 100 to 200 angstroms is sufficient for the present invention. After deposition of aluminum, oxygen is admitted into the vacuum system to oxidize the aluminum layer. The oxidized aluminum forms a passivating layer which will not react with the subsequent layers of manganese and bismuth. In addition, it acts as a barrier between the reactive substrate and the manganese and bismuth. The vacuum system is again pumped down to a suitable pressure for evaporating the bismuth and manganese layers. As described by Chen et al in U.S. Pat. No. 3,539,383, bismuth is deposited first and manganese is deposited over the bismuth. An optically transparent protective overcoating such as silicon monoxide or quartz is evaporated over the final layer of manganese. The substrate and the evaporated material are then heated to convert the manganese and bismuth layers into magnetic manganese bismuth compound. A temperature of about 180° C to about 250° C is desirable to avoid deforming of the flexible substrate, which would occur at the higher temperatures normally employed in the formation of manganese bismuth thin films. The temperature may, of course, be as high as the substrate will allow without deformation, provided the temperature is below the manganese bismuth damage temperature of 440° C.

The result of the process of the present invention is a highly advantageous magnetic storage element. A nonmagnetic substrate capable of reacting with manganese bismuth or its constituents is covered with a thin passivating layer of oxidized aluminum. A manganese bismuth thin film of about 100 angstroms to about 1,000 angstroms thickness covers the thin passivating layer. The preferred magnetization direction of the manganese bismuth film is oriented normal to the plane of the film. The thin passivating layer does not react with manganese bismuth or its constituents and acts as a barrier to any reaction between the nonmagnetic substrate and the manganese bismuth.

In one successful deposition process, manganese bismuth thin films were formed on samples of 1.3 mil thick Dupont Teflon FEP fluorocarbon film and 0.5 mil 3-M Scotchpak brand oven film number 5801. Aluminum was deposited at a vacuum or pressure level of about $6 \times 10^{-5}$ mm mercury. The vacuum during deposition of bismuth was about $3 \times 10^{-5}$ mm mercury, and during manganese deposition the vacuum was about $6.5 \times 10^{-5}$ mm mercury. The samples were covered with a protective coating and heated for 1½ hours at a temperature of about 230° C. The Faraday rotation from positive to negative saturation of the manganese bismuth films deposited on Teflon averaged about .785 degree and the Faraday rotation of the films deposited on Scotchpak polyester averaged about .95 degree.

Although this invention has been described with particular reference to the formation of manganese bismuth thin films on flexible nonmagnetic substrates, the method is equally applicable to other nonmagnetic substrates which are capable of reacting with manganese, bismuth, or manganese bismuth. The formation of uniform magnetic manganese bismuth thin films on metal substrates is of particular importance in optical memory applications, in which manganese bismuth film is formed on a nonmagnetic disk or drum substrate which is rotated at high speed. Conventional glass substrates tend to shatter or disintegrate at high speeds if the glass contains flaws. The use of metal substrates greatly reduces this danger. The present invention allows the deposition of manganese bismuth films on nonmagnetic metal substrates, even though the substrate is capable of reacting with manganese bismuth or its constituents.

While this invention has been particularly shown and described with reference to the preferred embodiments thereof, it will be understood by those skilled in the art that changes in form and detail may be made without departing from the spirit and scope of the invention.

The embodiments of the invention in which an exclusive property or right is claimed are defined as follows:

1. A magnetic storage element comprising:

a nonmagnetic substrate capable of reacting with manganese, bismuth, or manganese bismuth, a thin passivating layer of oxidized aluminum over the substrate, and a manganese bismuth thin film over the thin passivating layer, the manganese bismuth thin film having its preferred magnetization direction oriented normal to the plane of the manganese bismuth thin film.

2. The magnetic storage element of claim 1 and further comprising an optically transparent protective layer over the manganese bismuth thin film.

3. The magnetic storage element of claim 2 wherein the optically transparent protective layer comprises a layer of silicon monoxide.

4. The magnetic storage element of claim 1 wherein the nonmagnetic substrate is a flexible film.

5. The magnetic storage element of claim 4 wherein the flexible film is a synthetic organic material.

6. The magnetic storage element of claim 5 wherein the synthetic organic material is a high temperature polyfluoroethylene.

7. The magnetic storage element of claim 1 wherein the thin passivating layer has a thickness of between about 100 angstroms and about 200 angstroms.

8. The magnetic storage element of claim 1 wherein the manganese bismuth thin film has a thickness of between about 100 angstroms and about 1,000 angstroms.

9. The magnetic storage element of claim 1 wherein the nonmagnetic substrate is metal.

* * * * *